United States Patent [19]

Sugita et al.

[11] Patent Number: 5,268,803
[45] Date of Patent: Dec. 7, 1993

[54] DISC MEMORY APPARATUS UTILIZING DETECTION OF HIGH-ACCURACY ADDRESS DATA IN SHORT SERVO SECTORS FOR HIGH SPEED ACCESSING

[75] Inventors: Junkichi Sugita, Kanagawa; Yoshiyuki Kunito, Chiba, both of Japan

[73] Assignee: Sony Corporation, Tokyo, Japan

[21] Appl. No.: 825,992

[22] Filed: Jan. 27, 1992

[30] Foreign Application Priority Data

Jan. 31, 1991 [JP] Japan .................................. 3-032084

[51] Int. Cl.$^5$ ....................... G11B 21/02; G11B 7/095
[52] U.S. Cl. ............................ 360/77.08; 360/77.05; 360/78.011; 369/44.026
[58] Field of Search ............... 360/77.08, 78.04, 72.14, 360/78.11, 72.01, 77.02, 77.03, 77.05, 78.14; 369/32, 48, 58, 44.26

[56] References Cited

U.S. PATENT DOCUMENTS 5,065,382 11/1991 Seko et al. ..................... 360/77.08

*Primary Examiner*—Aristotelis Psitos
*Assistant Examiner*—Varsha V. Sheladia
*Attorney, Agent, or Firm*—Philip M. Shaw, Jr.

[57] ABSTRACT

A disc memory apparatus allows its magnetic head to reach a target track in a short period of time, wherein address data is recorded on each two-track width corresponding to each of the even-numbered and the odd-numbered tracks; either of two kinds of burst signals is recorded on each one-track width corresponding to each of the even-numbered and the odd-numbered tracks; the address of the record track is detected, based on the result of a comparison of two kinds of burst signals and the first address data, or in addition to this, the detected address data is further offset by the second address data; since the lengths of the servo sector areas required to detect the address data are shortened, the address data of the magnetic head are detected to a higher accuracy using a smaller number of reference signals; and the magnetic head can be moved at a fast speed, thus in a short period of time, resulting in a short seek time.

10 Claims, 3 Drawing Sheets

DISC MEMORY APPARATUS UTILIZING DETECTION OF HIGH-ACCURACY ADDRESS DATA IN SHORT SERVO SECTORS FOR HIGH SPEED ACCESSING

BACKGROUND OF THE INVENTION

This invention relates to a disc memory apparatus such as disc-shaped recording medium applicable to magnetic disc, and more particularly to an improvement of servo signal recorded at servo zone instituted in detecting positions.

As one type of magnetic discs, there is known a magnetic disc on which servo sectors pre-recorded with information for detecting positions at every predetermined length of tracks such as every sector are formed. Servo sectors of a conventional magnetic disc are shown in FIG. 1. A chaine line indicates a track center of each track of N−1th to N+3th tracks from the outside of the disc on which there are formed the tracks with track pitch Tp.

At the top of the servo sector are recorded a reference signal E which includes an identification signal and so on representing a start position of the servo sector. After the reference signal E are recorded address data with grey code, and subsequently predetermined burst signals are recorded in diced layout.

The burst signals are arranged as follows: first burst signals A1 are recorded on odd-numbered record tracks, and then, second burst signals B1 are recorded on even-numbered tracks. Third burst signals C1 are recorded on locations each of which is distanced by half the track pitch from the first burst signals A1, and fourth burst signals D1 are recorded on locations each of which is also distanced by half the track pitch from the second burst signals B1.

Such an arrangement allows the magnetic disc unit to detect the position of the magnetic head by means of an address data AD when the magnetic head passes along the proximity of a track center TC. The position data detected as above is used to move the magnetic head to a target track.

When the magnetic head passes near the spacing between adjacent record tracks, the magnetic disc unit determines whether the record track which the magnetic head now passes is an odd-numbered track or an even-numbered track, by comparing the signal level of the first burst signal A1 with that of the second burst signal B1.

Furthermore, when the magnetic head passes the Nth record track, for example, the magnetic disc unit can determine whether the magnetic head now passes the inner side or the outer side of the N-th track, by comparing the signal level of the third burst signal C1 with that of the fourth burst signal D1.

When no correct address data AD can be read with the magnetic head passing near the spacing between adjacent record tracks, the above-mentioned structure allows the magnetic disc unit to exactly locate the magnetic head and to perform the seeking operation fast, by using the first burst signals A1 through the fourth burst signals D1 as reference signals.

Furthermore, when the travel speed of the magnetic head is slowed down with a target track being near, the detected address data AD along with the result of comparison of the level of the first and second burst signals A1 and B1 is used, allowing the magnetic disc unit to locate the magnetic head accurately to within an accuracy of the pitch or better.

In the manner mentioned above, the magnetic disc unit achieves disc head placement within a short period of time, thereby resulting a short seek time.

However, the servo sectors, formed as mentioned above, are unavoidably elongated. In seek action, when the servo sector is long and, more particularly, the magnetic head is moved with a high travel speed, the problem is induced in that correct addresses can not read from the servo sector, because the magnetic head is moved across a plurality of tracks.

SUMMARY OF THE INVENTION

In view of the foregoing, an object of this invention is to provide a magnetic disc memory apparatus in which the position of the magnetic head is detected with high accuracy even when it moves at a high travel speed.

The foregoing object and other objects of the invention have been acheived by the provision of a disc memory apparatus 1, wherein a plurality of record memory apparatus comprising transducer means for reading and writing information on a disc, at least one disc medium having a plurality of tracks each of which is divided into plural data sectors and plural servo sectors therebetween, the data sectors having data signals recorded thereon; medium which includes servo sectors having first and second marker regions each center of which corresponds to a center of each even track and odd track, respectively, wherein first and second marker signals are prerecorded in the first and second marker regions, respectively. The servo sectors further have first and second address regions, wherein first and second address signals are prerecorded in the first and second address regions respectively. The width of the address regions in a radial direction of the disc medium is substantially larger than a track pitch of the tracks. Positioning means position the transducer means on a selected one of the tracks. Comparator means compare levels of the first marker signal and the second marker signal and output a comparison signal which is supplied to a servo signal generating means for generating a servo control signal according to the comparison signal in such a manner that the servo signal is generated according to the first address signal when the level of the first marker signal is larger than that of the second marker signal and that the servo signal is generated according to both of the first address signal and the second address signal when the level of the second marker signal is larger than that of the first marker signal. The position control means control the positioning means in response to the servo control signal so that the transducer means seeks the selected one of the tracks.

The servo sector length required for address detection can be shortened, allowing high-accuracy location information to be obtained.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
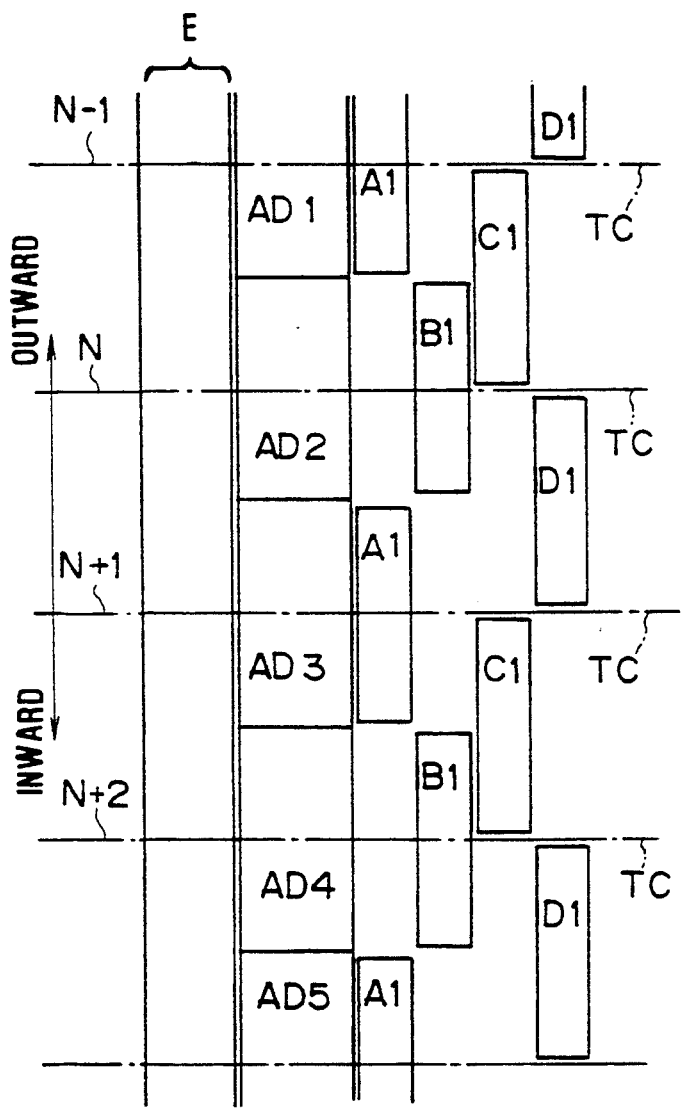
FIG. 1 is a simplified diagram showing the prior art servo sectors.
Figure 2:
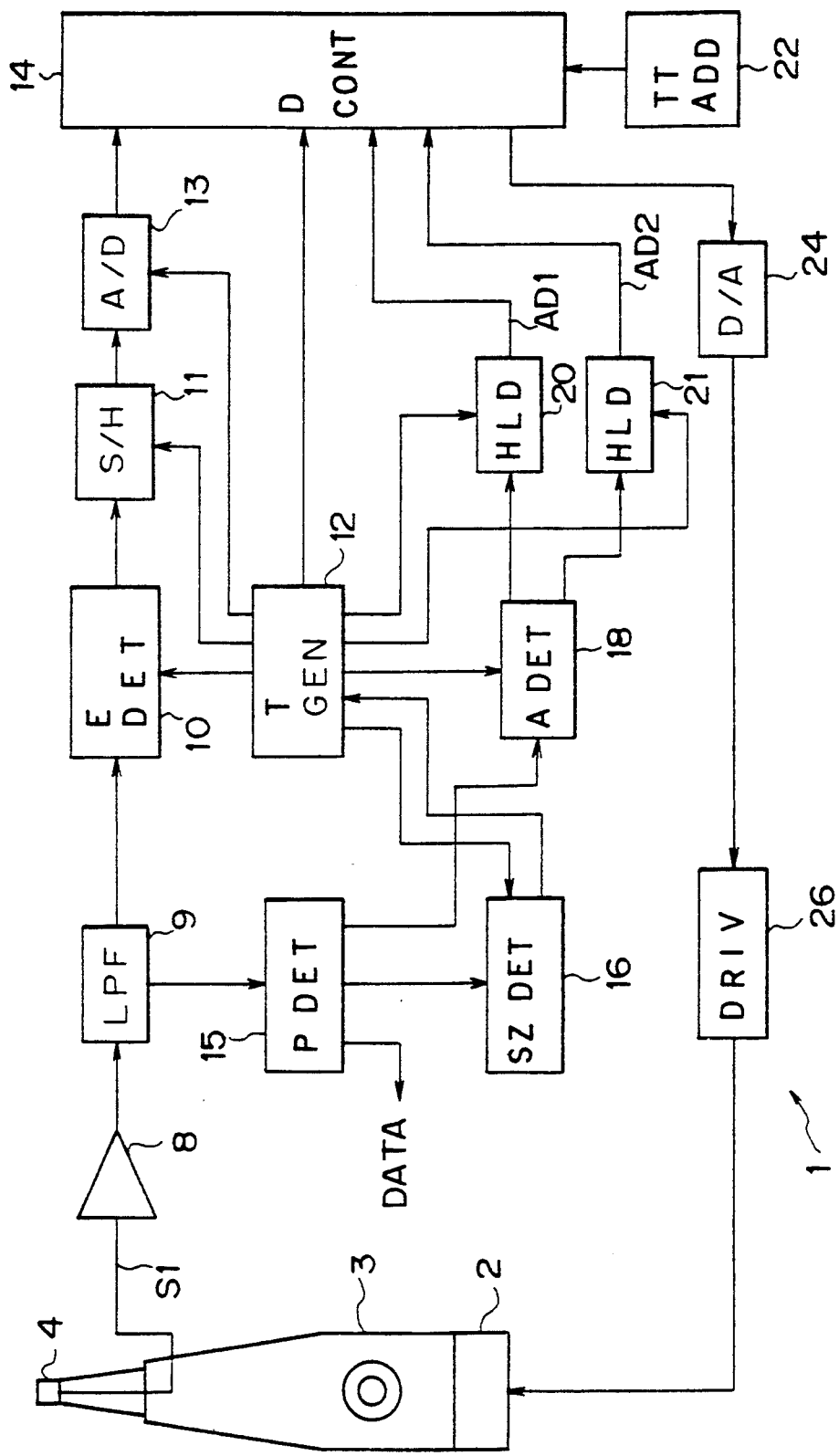
FIG. 2 is a block diagram of an embodiment of the disc memory apparatus according to the present invention.

Preferred embodiments of this invention will be described with reference to the accompanying drawings:

FIG. 2 generally denotes a disc memory apparatus constituted by a magnetic disc unit 1. An actuator 2 having a voice-coil motor is driven so that a magnetic head 4 mounted on the end of an arm 3 is moved along the radial direction of magnetic disc 6 (shown in FIG. 3).

Figure 3:
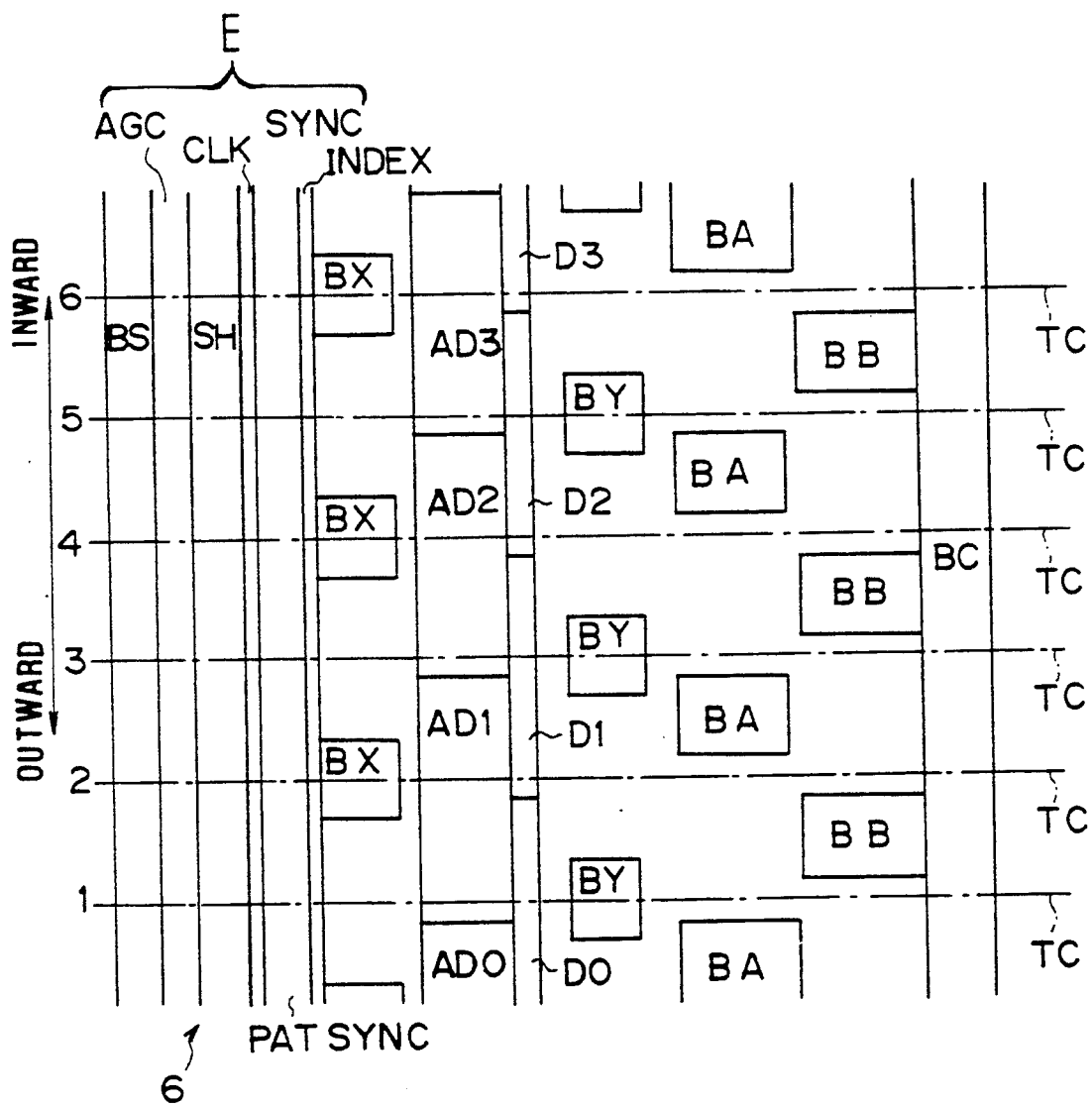
FIG. 3 is a simplified diagram showing the servo sectors of the magnetic disc.

On the magnetic disc 6, as shown in FIG. 3, servo sectors are formed in a predetermined period on the disks so that the magnetic head 4 is positioned to a target record track according to a signal read from a corresponding servo sector.

Specifically, in each servo sector, predetermined reference signals E (i.e., a pre-burst signal BS, a signal level offset signal AGC, a synchronizing signal SYNC, and the like) are recorded first, and, then, a first burst signal BX is recorded on the record track width, centered on each track center TC of even-numbered record tracks.

Further to the above, in each servo sector, 10 most significant bits of the address data (hereinafter, referred to as first address data) AD0, AD1, AD2, ..., of each of the even-numbered tracks 2, 4, 6, ... are first recorded onto the two track-pitch width, which is centered on the track center TC of each of the even-numbered tracks; then, the remaining least significant bits of the address data (hereinafter, referred to as second address data) D0, D1, D2, ..., in which one entire address data contains 11 bits, with the second address data sequentially alternating between 1 and 0, are recorded onto two track-pitch width which is at a position shifted outward (that is, in the direction in which the address data increases) by one track-pitch width from the corresponding first address data.

Next, in the servo sector, the second burst signal BY is recorded on one track width, centered on the track center TC of each of the odd-numbered tracks 1, 3, 5, ... In this embodiment, the magnetic head 4 is located according to the detected signals from the first burst signal BX through the second burst signal BY.

The magnetic disc unit 1 determines whether the magnetic head 4 has scanned an even-numbered track or an odd-numbered track, by comparing the signal level of the first burst signal BX with that of the second burst signal BY.

Specifically, when data AD2 is detected as address data, and when the signal level of the first burst signal BX is greater than that of the second burst signal BY, the record track now scanned by the magnetic head 4 is judged to be the fourth track.

Since, in the magnetic disc unit 1, 10 most significant bits of all 11 bit address data of the even-numbered bits are recorded as the first address data, address data of the record track is easily obtained by shifting the first address data AD2 by one bit.

Assuming that the first address data AD2 is C1, the address data AD is expressed by the following equation:

$$AD = C1 \times 2 \tag{1}$$

When data AD2 is detected as address data, and when the signal level of the first burst signal BX is smaller than that of the second burst signal BY, the record track now scanned by the magnetic head 4 is judged to be the third or fifth record track. Furthermore, when the second address data is 0, the track now scanned by the magnetic head 4 is judged to be the third record track. When the second address data is 1, on the other hand, the track now scanned by the magnetic head 4 is judged to be the fifth record track.

The address data AD is thus expressed by the following equation, if the first address data AD2 is even-numbered, with the second address data being 0.

$$AD = C1 \times 2 - 1 \tag{2}$$

The address data AD is expressed by the following equation, if the second address data is 1.

$$AD = C1 \times 2 + 1 \tag{3}$$

The record track which is scanned by the magnetic head 4 is judged to be the first record track, when the odd-numbered data AD1 is detected as the first address data, with the second address data being 0, and with the signal level of the first burst signal BX being smaller than that of the second burst signal BY. On the other hand, when the second address data is 1 with the rest of the conditions remaining unchanged, the record track which is scanned by the magnetic head 4 is judged to be the third record track.

The address data AD is thus expressed by the following equation, if the first address data is odd-numbered, with the second address data being 0.

$$AD = C1 \times 2 + 1 \tag{4}$$

The address data AD is expressed by the following equation, if the second address data is 1, $$AD = C1 \times 2 - 1 \tag{5}$$

As mentioned above, the address data AD is detected based on the first address data AD1, AD2, ..., and based on the result of comparison of the signal level of the burst signal BX to that of the burst signal BY. Also, the second address data D1, D2, ..., are, as required, used to help obtain the correct address data AD by offsetting the detected address data above.

All the magnetic disc unit needs on the magnetic disc 6 to detect the address data of each record track is the 11 bit address data consisting of AD1, AD2, ..., and D1, D2, ..., in addition to two burst signals BX and BY. Such a structure allows the length of servo sector for detection of the address data AD to be shortened.

Thanks to this structure, even if the magnetic head 4 is moved fast, the address data is detected easily and reliably, achieving an efficient seek operation.

Furthermore, in the servo sectors formed as mentioned above, along with two kinds of address data, AD0, AD1, ..., D0, D1, ..., either of two kinds of burst signals, BX and BY, which are of equal signal level with each other, is recorded on the track center portion of each record track. Such a structure causes highly accurate address data to be detected, thereby making it easier to manufacture the magnetic disc 6.

Further to the burst signal BY, in the magnetic disc 6, servo signals BA and BB, for tracking control, are recorded in a diced layout, followed by predetermined reference signal BC. All these as a whole, form a servo sector.

In the magnetic disc unit 1, the detected signal S1 from the magnetic head 4, after it is first amplified by a amplifier circuit 8, is fed to an envelope detector circuit 10 via a low-pass filter circuit 9.

A sample and hold circuit 11 samples and holds the output from the envelope detector circuit 10, at the predetermined timing according to the reference signal output from a timing generator 12. The output from the sample and hold circuit 11 is fed to a drive controller 14 via an analog-to-digital converter circuit 13.

The sample and hold circuit 11 samples and holds the first and second burst signals BX and BY, and the servo signals BA and BB for the tracking control are, to be fed to the drive controller 14.

In response to the input signal S1 to the low-pass filter circuit 9, a peak detector circuit 15 waveform shapes the detected signal S1 by detecting its peak value.

In the magnetic disc unit 1 as described above, data DATA recorded on the magnetic disc 6 results, by producing the output from the peak detector circuit 15 with the magnetic head 4 being track controlled.

A servo zone detector circuit 16 detects reference signals E at each servo sector header (that is, the pre-burst signal BS, the synchronizing signal SYNC, and the like), causing the timing signal synchronized to the reference signals to be fed to the timing generator 12.

In response to the timing signal, the timing generator 12 outputs a sample-hold signal to the sample and hold circuit 11, at the timing that the magnetic head 4 scans each record area of the burst signals BX and BY, and the servo signals BA and BB.

Based on the detected signal S1, the sample and hold circuit 11 can thus reliably sample and hold the first and second burst signals BX and BY, and the servo signals BA and BB for the tracking control.

The timing generator 12 feeds predetermined timing signals to an address decoder circuit 18, hold circuits 20 and 21, allowing the address data to be detected.

Specifically, the address decoder circuit 18 detects and feeds the first and second address data respectively to the hold circuits 20 and 21, by picking up the output signal from the peak detector circuit 15 at the timing of the predetermined timing signal.

The hold circuits 20 and 21 hold the first address data and the second address data, respectively, and feeds them to the drive controller 14 at the predetermined timing.

The drive controller 14 thus obtains the first address data and the second address data, based on each output from both of the hold circuits 20 and 21, and also obtains the first burst signal BX and the second burst signal BY, based on the output signal from the analog-to-digital converter circuit 13. The drive controller 4 further performs arithmetic operations expressed by Equations 1 through 5, resulting in the address data of a record track.

The drive controller 14 further detects an error between the data of the current address and the data of the target track address 22, and provides a control signal according to the error.

The drive controller 14 feeds the control signal to a driver 26 to drive it, via a digital-to-analog converter 24, in order to move the magnetic head 4 to the target record track.

When a large error is detected, the drive controller 14 accelerates sharply the magnetic head 4 to quickly move to the target record track.

Specifically, the drive controller 14 obtains the travel speed of the magnetic head 4 by detecting address data one by one sequentially and then determining a rate of address data change; then, the actuator 2 is controlled so that the travel speed varies in accordance with a predetermined pattern of speed change.

Since the lengths of the servo sectors required to detect the address data are shortened, the address data are detected easily and reliably even when the magnetic head 4 is moved fast. The movement of the magnetic head 4 is thus controlled at a high accuracy, resulting in a short seek time.

When a small error is detected on the other hand, the drive controller 14 accelerates gradually the magnetic head 4 to move to the target record track. When the speed of the magnetic head 4 is slow, the drive controller 14 locates the magnetic head 4 to within an accuracy better than the record track pitch, based on the result of comparison of the detected address data AD and the tracking control servo signals BA and BB. The travel speed of the magnetic head 4 is thus finely controlled.

When the magnetic head 4 reachs the target track, the drive controller 14 tracking-controls the magnetic head 4, based on the signal level of the servo signals BA and BB, in order to write or read a desired data on the selected track.

In the magnetic disc unit 1 in the above construction, the envelope detector circuit 10 detects the signal S1 and feeds it to the sample and hold circuit 11 to be sampled and held there, resulting in signal levels of the first and second burst signals BX and BY, and of the tracking control servo signals BA and BB.

Furthermore, in the magnetic disc unit 1, the detected signal S1 is, after being waveform reshaped by the peak detector circuit 15, fed to the address decoder 18. The address decoder 18 supplies its output to the hold circuits 20 and 21, which obtain respectively the first address data and the second address data.

If the level of the first burst signal BX is greater than that of the second burst signal BY, the address data of the record track is easily obtained by multiplying the first address data AD2 by two.

On the other hand, if the level of the first burst signal BX is smaller than that of the second burst signal BY, the address data of the record track is obtained by multiplying the first address data AD2 by two, and then being offset by the second address data, by means of arithmetic operations expressed by Equations 2 through 5.

In the magnetic disc unit 1 as mentioned above, the magnetic head 4 is moved easily and reliably to the target track, based on the result of the detected address data.

According to the above-mentioned structure, address data is recorded on each two-track width corresponding to each of the even-numbered and odd-numbered tracks. Either of two kinds of bust signals is recorded on each one-track width corresponding to each of the even-numbered and odd-numbered tracks. The address of the record track is detected, based on the result of a comparison of the two kinds of burst signals and the first address data, or in addition to this, the detected address data is further offset by the second address data.

Since the lengths of the servo sectors required to detect the address data are shortened, the address data of the magnetic head are detected to a higher accuracy.

The magnetic head 4 can be moved at a fast speed, thus in a short period of time, resulting in a short seek time.

In the above embodiment, the entire address data AD1, AD2, ..., D1, D2, ..., consisting of 11 bits, are recorded. The present invention is not limited to this. Any size of address data other than an 11 bit one may be used.

Also, in the above embodiment, the second address data is recorded in succession to the first one. The present invention is not limited to this. The arrangement may be reversed.

Further, in the above embodiment, the first address data is recorded to the location of the track center of the even-numbered track and the second address data is recorded to the location of the track center of the odd-numbered track. The present invention is not limited to this. The first address data may be recorded to the location of the track center of the odd-numbered track, and the second address data may be recorded to the location of the track center of the even-numbered track.

Furthermore, in the above embodiment, the first address data and the second address data are recorded with two track pitches. The present invention is not limited to this. When the first address data is recorded to the location by the track center of the even-numbered (the odd-numbered) track, there may be the changed point of the value of the first address data at or near the location of the track centers of the even-numbered (the odd-numbered) tracks near the locations of the even-numbered (the odd-numbered) tracks being both sides of the odd-numbered (the even-numbered) track, which for example, in the above embodiment, may be such a location detected that the signal level of the burst signal BY is larger than that of the burst signal BX. Conversely, when the second address data is recorded to the location of the track center of odd-numbered (the even-numbered) track, there may be the changed point of the value of the second address data at or near the track centers of the even-numbered (the odd-numbered) tracks, being both sides of the odd-numbered (the even-numbered) track of the even-numbered (the odd-numbered) tracks, which for example, in the above embodiment, may be such a location detected that the signal level of the burst signal BX is larger than that of the burst signal BY.

As mentioned above, the present invention provides a disc memory apparatus, wherein high-accuracy address data is detected using short servo sectors, moving the magnetic head fast, and consequently achieving a short seek time, by recording two kinds of address data on each two-track width and two kinds of burst signals on each one-track width, all in a diced layout, by detecting the address data of the record track, based on the result of comparison of two kinds of burst signals and based on the first address data, or in addition to this, by offsetting the detected address data by the second address data.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:
1. A disc memory apparatus comprising:
   transducer means for reading and writing information on a disc;
   at least one disc medium having a plurality of tracks each of which is divided into plural data sectors and plural servo sectors therebetween;
   the data sectors having data signals recorded thereon;
   the servo sectors having first and second marker regions each center of which corresponds to a center of each even track and odd track, respectively, wherein first and second marker signals are prerecorded in the first and second marker regions, respectively;
   the servo sectors further have first and second address regions, wherein first and second address signals are prerecorded in the first and second address regions respectively;
   the width of the address regions in a radial direction of the disc medium being substantially larger than a track pitch of the tracks;
   positioning means position the transducer means on a selected one of the tracks;
   comparator means for comparing levels of the first marker signal and the second marker signal and for outputting a comparison signal;
   servo signal generating means for generating a servo control signal according to the comparison signal in such a manner that the servo signal is generated according to the first address signal when the level of the first marker signal is larger than that of the second marker signal and that the servo signal is generated according to both of the first address signal and the second address signal when the level of the second marker signal is larger than that of the first marker signal; and
   position control means for controlling the positioning means in response to the servo control signal so that the transducer means seeks the selected one of the tracks.

2. A disc memory apparatus according to claim 1, wherein the second address region is shifted in a radial direction by substantially one track pitch from the corresponding first address region.

3. A disc memory apparatus according to claim 2, wherein the second address signal sequentially alternates between a first value and a second value.

4. A disc memory apparatus according to claim 2, wherein the first address region and the second address region are formed adjacent to each other in a direction perpendicular to the radial direction.

5. A disc memory apparatus according to claim 4, wherein the second address signal is a one bit signal.

6. A disc memory apparatus according to claim 2, wherein the servo signal generating means for generating servo control signal in such a manner that the servo signal is generated by processing the first address signal and the second address signal using a first equation when the level of the second marker signal is larger than that of the second address signal and the second address signal is a first value and the servo signal is generated by processing the first address signal and the second address signal using a second equation when the level of the second marker signal is larger than that of the second address signal and the second address signal is a second value.

7. A disc memory apparatus according to claim 1, wherein the servo sectors have first and second fine servo regions, the first fine servo region being located in an outer side of each of the odd one of the tracks and in a inner side of each even one of the tracks, and the second fine servo region being located in an inner side of each of the odd one of the tracks and in an outer side of each even one of the tracks.

8. A disc memory apparatus comprising:
transducer means for reading and writing information on a disc;
at least one disc medium having a plurality of tracks each of which is divided into plural data sectors and plural servo sectors therebetween;
the data sectors having data signals recorded thereon;
the servo sectors having first and second marker regions each center of which corresponds to a center of each even track and odd track, respectively, wherein first and second marker signals are prerecorded in the first and second marker regions, respectively;
the servo sectors further having address regions where address signals are prerecorded, wherein a first bit group is a first address signal and a second bit group is a second address signal, the width of the address regions in a radial direction of the disc medium being substantially larger than a track pitch of the tracks;
positioning means for positioning the transducer means on a selected one of the tracks;
comparator means for comparing levels of the first marker signal and the second marker signal and for outputting a comparison signal;
servo signal generating means for generating a servo control signal according to the comparison signal in such a manner that the servo signal is generated using the first address signal when the level of the first marker signal is larger than that of the second marker signal and that the servo signal is generated using the first address signal corrected using the second address signal when the level of the second marker signal is larger than that of the first marker signal; and
position control means for controlling the positioning means in response to the servo control signal so that the transducer means seeks the selected one of the tracks.

9. A disc memory apparatus according to claim 8, wherein the second bit group consists of one bit.

10. A disc memory apparatus according to claim 9, wherein the one bit in the second bits group is sequentially alternated between 0 and 1 and is each second bit group shifted in a radial direction by substantially one track pitch from a corresponding first bits group.

* * * * *